US007058209B2

(12) United States Patent
Chen et al.

(10) Patent No.: US 7,058,209 B2
(45) Date of Patent: *Jun. 6, 2006

(54) METHOD AND COMPUTER PROGRAM PRODUCT FOR LOCATING FACIAL FEATURES

(75) Inventors: Shoupu Chen, Rochester, NY (US); Mark R. Bolin, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 727 days.

This patent is subject to a terminal disclaimer.

(21) Appl. No.: 09/994,096

(22) Filed: Nov. 26, 2001

(65) Prior Publication Data

US 2003/0053663 A1    Mar. 20, 2003

Related U.S. Application Data

(60) Provisional application No. 60/323,579, filed on Sep. 20, 2001.

(51) Int. Cl.
 *G06K 9/00* (2006.01)
(52) U.S. Cl. .................. 382/117; 382/118; 382/225; 382/291
(58) Field of Classification Search ................ 382/115, 382/117, 118, 225, 291
See application file for complete search history.

(56) References Cited

U.S. PATENT DOCUMENTS

| 5,432,863 | A | 7/1995 | Benati et al. ............... 382/167 |
| 5,878,156 | A * | 3/1999 | Okumura .................... 382/118 |
| 6,072,892 | A | 6/2000 | Kim .......................... 382/117 |
| 6,108,446 | A * | 8/2000 | Hoshen ...................... 382/225 |
| 6,292,574 | B1 | 9/2001 | Schildkraut et al. ........ 382/117 |
| 6,600,830 | B1 * | 7/2003 | Lin et al. .................... 382/117 |
| 6,792,134 | B1 * | 9/2004 | Chen et al. ................. 382/117 |
| 2002/0106112 | A1 * | 8/2002 | Chen et al. ................. 382/117 |
| 2002/0114495 | A1 * | 8/2002 | Chen et al. ................. 382/117 |
| 2003/0021448 | A1 * | 1/2003 | Chen et al. ................. 382/117 |

FOREIGN PATENT DOCUMENTS

| EP | 0 899 680 A | 3/1999 |
| EP | 1 229 493 A | 8/2002 |
| WO | 97 211 88 A | 6/1997 |

OTHER PUBLICATIONS

U.S. Appl. No. 09/740,562, filed Dec. 19, 2000, Chen et al.

(Continued)

*Primary Examiner*—Samir Ahmed
*Assistant Examiner*—Charles Kim
(74) *Attorney, Agent, or Firm*—David M. Woods

(57) ABSTRACT

A digital image processing method detects facial features in a digital image. This method includes the steps of detecting iris pixels in the image, clustering the iris pixels, and selecting at least one of the following schemes to identify eye positions: applying geometric reasoning to detect eye positions using the iris pixel clusters; applying a summation of squared difference method using the iris pixel clusters to detect eye positions; and applying a summation of squared difference method to detect eye positions from the pixels in the image. The method applied to identify eye positions is selected on the basis of the number of iris pixel clusters, and the facial features are located using the identified eye positions.

18 Claims, 10 Drawing Sheets

OTHER PUBLICATIONS

U.S. Appl. No. 09/740,422, filed Dec. 19, 2000, Chen et al.

"Distance to an Ellipsoid" by John C. Hart. Graphics Gems IV, Paul S. Heckbert, Editor, Academic Press, Boston, MA, pp. 113-119.

"Active shape Models—Their Training and Application" by T.F. Cootes, C.J. Taylor, D.H. Cooper, and J. Graham. Computer Vision and Image Understanding, vol. 61, No. 1, pp. 38-59, 1995.

Saber E. et al., "Face Detection and Facial Feature Extraction Using Color, Shape and Symmetry-based Cost Functions" Proceedings of the International Conference on Pattern Recognition, XX, XX, vol. 3, 1996, pp. 654-658, XP000863534 paragraph '0002.

Chow G. et al., "Towards a System for Automatic Facial Feature Detection" Pattern Recognition, Pergamon Press Inc. Elmsford, NY, US, vol. 26, No. 12, Dec. 1, 1993, pp. 1739-1755, XP000420368; ISSN: 0031-3208, paragraph '03.1-paragraph '03.2.

\* cited by examiner

# METHOD AND COMPUTER PROGRAM PRODUCT FOR LOCATING FACIAL FEATURES

CROSS-REFERENCE TO RELATED APPLICATION(S)

This application claims the benefit of Provisional Application No. 60/323,579 filed Sep. 20, 2001.

Reference is made to commonly assigned copending application Ser. No. 09/740,562, filed Dec. 19, 2000 and entitled "Multi-Mode Digital Image Processing Method for Detecting Eyes", in the names of Shoupu Chen and Lawrence A. Ray.

FIELD OF THE INVENTION

The present invention relates to digital image understanding methods and more particularly to methods for detecting human facial features.

BACKGROUND OF THE INVENTION

The ability to detect the locations of facial features is useful for a variety of applications. These applications include automatic facial morphing and warping, expression recognition, hair segmentation, face recognition and classification, red-eye detection, and facial image compression. Many of the techniques that are used to locate the positions of facial features are also useful for a variety of other general image feature detection tasks. These can include identifying organs in medical imagery and locating circuit board components in industrial vision applications.

Facial feature finding has been studied by a number of researchers. There are mainly four categories of facial feature finding algorithms. They are template matching, edge detection, shape models, and holistic matching. Techniques that use shape models seem to be the most promising. These methods use a model of the feature shape to constrain the search to plausible results. This increases both the accuracy of the feature finder and the range over which the features can be uniquely identified. Deformable templates and active shape models are the two most popular approaches. Deformable templates need an explicitly parameterized model of the feature shape. This limits the applicability of the technique to shapes that are easily parameterized and reduces the accuracy of the results for shapes that do not strictly conform to the parameters of the shape model. Active shape models on the other hand, learn a model of the feature shape based on a series of ground truth examples. This enables the method to be applicable to a much broader class of feature shapes.

The active shape model technique was developed by Cootes et al. (see Cootes, T. F., Taylor, C. J., Cooper, D. H., "Active Shape Models—Their Training and Application," *Computer Vision and Image Understanding*, Vol. 61, No. 1, pp. 38–59, 1995). It provides a model-based mechanism for locating objects in images. A flexible approach to modeling is used that is applicable to a broad class of target objects. The procedure consists of both a training and a searching stage. During training a set of example images are manually annotated with a series of control points that indicate the ground truth feature positions. These feature locations are analyzed to develop a model of the shape of the plausible relative positions of the control points. Models of the texture around each control point are also created. These models are generated once and stored for use in subsequent searches.

During searching, a series of local searches are performed at each feature point to find the location that best matches the texture model for that feature. The global shape model is then used to constrain the results of the local searches. This process iterates until it converges upon a stable result.

In Cootes' system, the searching operation requires an approximate starting location that has to be provided by a user. This user intervention could be replaced by an automatic process of finding certain features, preferably, two eyes, with a simple, fast method.

Methods are known in the art for detecting human eyes in a digital image. For example, U.S. Pat. No. 6,072,892 discloses the use of a thresholding method to detect the position of human eyes in a digital image. In this method, a scanning window scans across the entire image using a raster scanning method. A histogram extractor extracts an intensity histogram from the window as it scans across the image. Each intensity histogram is examined by a peak detector to find three peaks in the histogram representing the skin, the white of the eye, and the black of the pupil. A histogram having the three peaks identifies a location in an image that potentially defines an eye position. Eye position is determined from among the potential locations by calculating the area under the histogram associated with each potential location and by selecting the location that is associated with the histogram with the largest area.

One of the problems with this approach is that the entire image must be scanned on a pixel-by-pixel basis. Thus, a search window must be positioned at each pixel in the image and a histogram must be assembled at each pixel location. Further, the area under each histogram must be calculated and stored. It will be appreciated that this method consumes enormous amounts of computing power and reduces the rate at which images can be processed. This method can also produce a high rate of false positives.

Methods are also known to detect human eyes that have abnormally high red content. Such abnormally high red content is commonly associated with a photographic phenomenon known as red eye. Red eye is typically caused by a flash of light that is reflected by a pupil. As is described in commonly assigned U.S. Pat. No. 6,292,574, it is known to search in images for pixels having the high red content that is indicative of red eye. Similarly, commonly assigned U.S. Pat. No. 5,432,863 describes a user interactive method for detecting pixels in an image that have color characteristic of red eye. It will be recognized that these methods detect eyes only where red eye is present.

Note that in Cootes' system, the search process uses a shape model coefficient constraining method that does not select a most similar shape within the ground truth shape space. Also, Cootes' system uses constant scale texture model search windows that restrict the accuracy of the final results that the system can reach. Cootes' system assumes that the scale of the objects are fixed. This requires that images that portray objects of different sizes be scaled in a pre-processing step. This scale factor could be based on an initial estimate of the object's size. The assumption of a fixed scale has the potential to improve the performance by enabling the image to be scaled once during a pre-processing step rather than repeatedly scaling the texture windows when searching. However, utilizing a fixed scale limits the adaptability of the algorithm and adversely affects the accuracy when the initial estimate of the scale is incorrect.

Therefore, there is a need for constructing a system having an ability of automatically determining a starting point search location with no user intervention by using an eye detection mechanism. There is also a need for the system to have abilities of selecting a best shape model among the ground truth shape space and to vary the scale of the texture model and search windows.

SUMMARY OF THE INVENTION

The present invention is directed to overcoming one or more of the problems set forth above. Briefly summarized, according to one aspect of the present invention, the invention resides in a method for detecting facial features in a digital image. This method includes the steps of detecting iris pixels in the image, clustering the iris pixels, and selecting at least one of the following methods to identify eye positions: applying geometric reasoning to detect eye positions using the iris pixel clusters; applying a summation of squared difference method using the iris pixel clusters to detect eye positions; and applying a summation of squared difference method to detect eye positions from the pixels in the image. The method applied to identify eye positions is selected on the basis of the number of iris pixel clusters, and the facial features are located using the identified eye positions.

According to another aspect of the invention, the invention also resides in a computer program product for detecting facial features in a digital image. The computer program product comprises a computer readable storage medium having a computer program stored thereon for performing the steps of detecting iris pixels in the image, clustering the iris pixels, and selecting at least one of the following methods to identify eye positions: applying geometric reasoning to detect eye positions using the iris pixel clusters; applying a summation of squared difference method using the iris pixel clusters to detect eye positions; and applying a summation of squared difference method to detect eye positions from the pixels in the image. The method applied to identify eye positions is selected on the basis of the number of iris pixel clusters, and the facial features are located using the identified eye positions.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
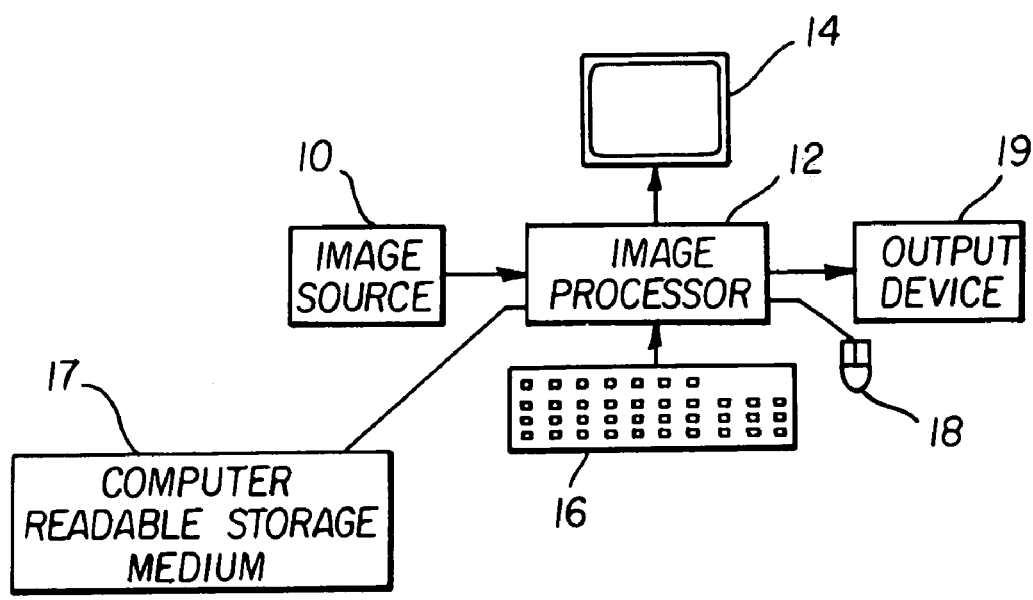
FIG. 1 is a schematic diagram of an image processing system useful in practicing the present invention.

FIG. 1 shows an image processing system useful in practicing the present invention. The system includes a color digital image source 10, such as a film scanner, a digital camera, or digital image storage device(such as a compact disk drive with a Picture CD). The digital image from the digital image source 10 is provided to an image processor 12, such as a programmed personal computer or a digital image processing work station, such as a Sun Sparc 20 workstation. The image processor 12 may be connected to a CRT display 14 and an operator interface, such as a keyboard 16 and a mouse 18. The image processor 12 is also connected to a computer readable storage medium 17. The image processor 12 transmits processed digital images to an output device 19. The output device 19 can comprise a hard copy printer, a long term image storage device, a connection to another processor, or an image telecommunication device connected, for example, to the internet.

In the following description, a preferred embodiment of the present invention will be described as a method. However, in another preferred embodiment, the present invention comprises a computer program product for detecting facial features in a digital image in accordance with the method described. In describing the present invention, it should be apparent that the computer program of the present invention can be utilized by any well-known computer system, such as the personal computer of the type shown in FIG. 1. However, many other types of computer systems can be used to execute the computer program of the present invention. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The computer program for performing the method of the present invention may be stored in a computer readable storage medium. This medium may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

Figure 2:
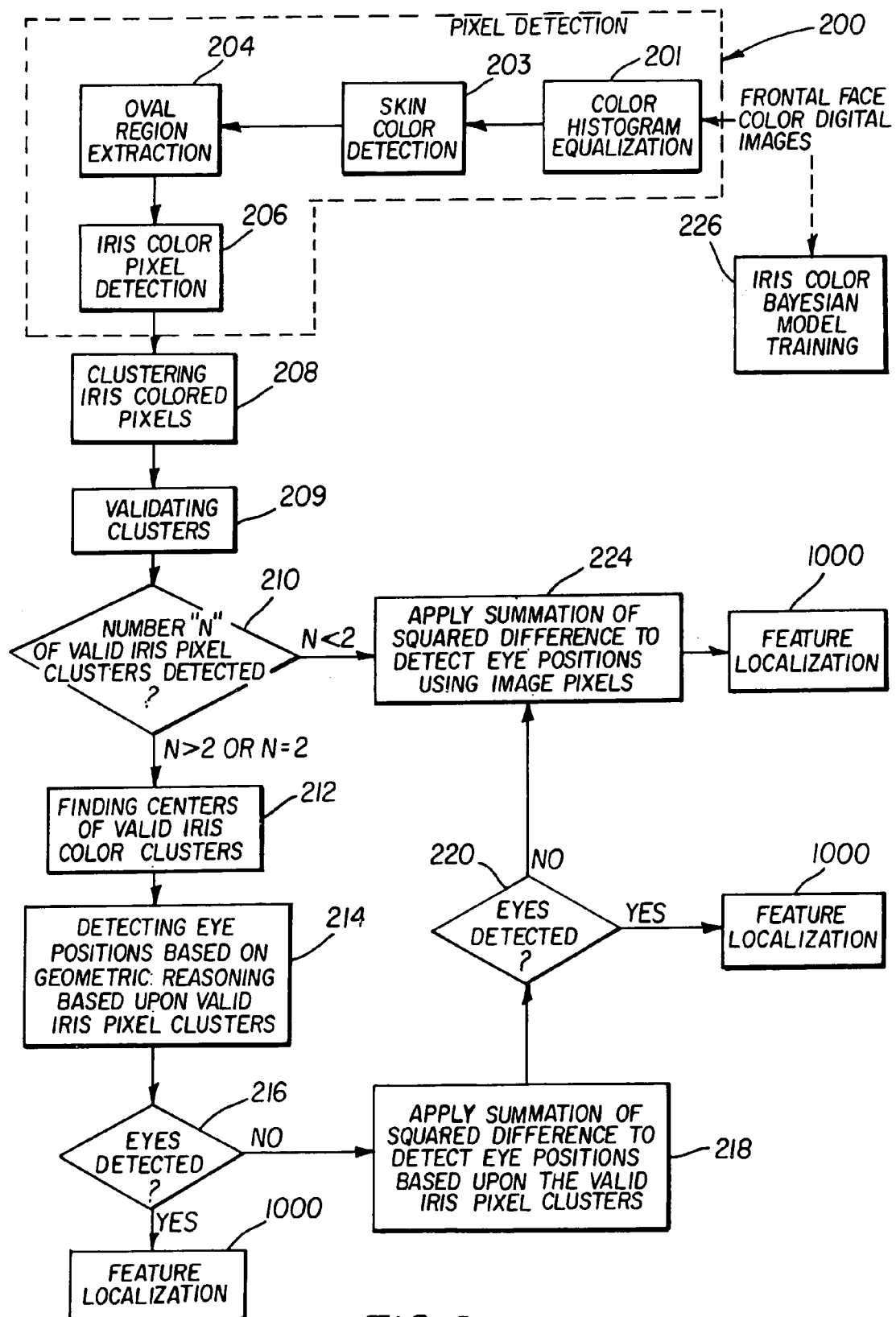
FIG. 2 is a flowchart illustrating the eye detection method of the present invention.

Turning now to FIG. 2, the method of the present invention will be described in greater detail. FIG. 2 is a flow chart illustrating one embodiment of the eye detection method of the present invention. FIG. 2 shows that a digital color image to be processed is first input into an iris color pixel detection step 200. In the embodiment shown, iris color pixel detection is accomplished by first detecting skin color regions in the image and then identifying iris color pixels by measuring red intensity levels from within the skin color regions.

The first step in skin color detection is color histogram equalization shown in FIG. 2 as step 201. Color histogram equalization step 201 receives images to be processed and ensures that the images are in a form that will permit skin color detection. This step is made necessary because human skin may take on any number of colors in an image because of lighting conditions, flash settings and film characteristics. This makes it difficult to automatically detect skin in such images. In Color Histogram Equalization step 201, a statistical analysis of each image is performed. If the statistical analysis suggests that the image may contain regions of skin that have had their appearance modified by lighting conditions, then such images are modified so that skin colored regions can be detected.

After the Color Histogram Equalization step, the image is searched for skin color regions in Skin Color Detection step 202. While it is possible to detect skin in a digital image in a number of ways, a preferred method for detecting skin in a digital image is to separate skin color pixels from other pixels in an image by defining a working color space that contains a range of possible skin colors collected from a large, well-balanced population of images. A pixel is then identified as skin color pixel if the pixel has a color that is within the working color space.

Skin Color Detection step 202 identifies a region of skin color pixels in the image. This region can be defined in any number of ways. In one embodiment, the skin color region is defined by a set of pixel locations identifying the pixels in the image having skin colors. In another embodiment, a modified image is generated that contains only skin color pixels. In yet another embodiment, Skin Color Detection step 202 defines boundaries that confine the skin color region in the image. It will be recognized that more than one skin color region can be identified in the image.

Oval Region Extraction step 204 examines the skin color regions detected by the Skin Color Detection step 202 to locate skin color regions that may be indicative of a face. Because the human face has a roughly oval shape, the skin color regions are examined to locate an oval shaped skin color region. When an oval shaped skin color region is found, the Oval Region Extraction step 204 measures the geometric properties of the oval shaped skin color region. The Oval Region Extraction step 204 uses these measurements to define parameters that describe the size of the face and the location of the face within the image.

Figure 3:
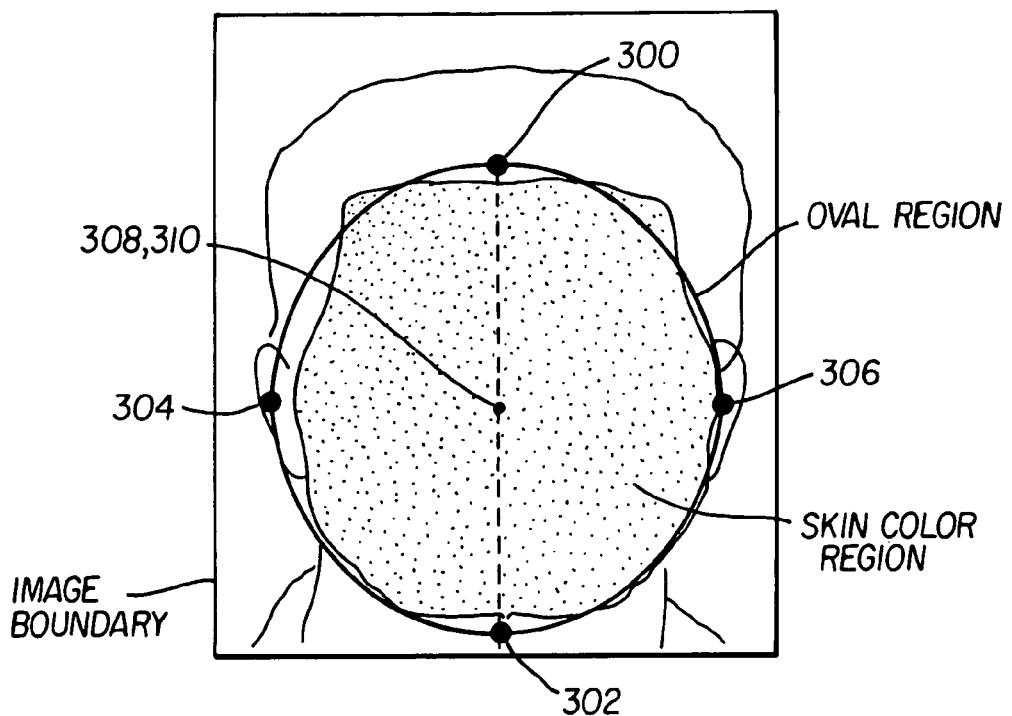
FIG. 3 is an illustration of the relationship between certain geometric parameters and an oval shaped skin color region in an image.

FIG. 3 is an illustration of the relationship between the geometric parameters used to define an oval shaped skin color region in the image. As is shown in FIG. 3, these parameters include Oval_top 300, Oval_bottom 302, Oval_left 304, Oval_right 306, Oval_center_row 308, and Oval_center_column 310. These parameters are used in later steps of the present method to increase the efficiency of the eye detection process. It will be recognized that the method of the present invention can be practiced using skin color detection regions that have shapes that are other than oval and that other geometric parameters can be defined in association with such shapes. It will also be recognized that it is not necessary to detect an oval or other shaped area in the image. In such a case, the skin color region is examined to detect iris color pixels. Further in this case, still other parameters describing the skin color region are defined for use in the eye detection process.

After oval region extraction has been performed, the oval shaped skin color region is searched for iris color pixels. This step is performed by Iris Color Pixel Detection step 206. It will be recognized that limiting the search for iris color pixels to those pixels within the oval shaped skin color region increases the efficiency of the iris color pixel detection. It will also be recognized that there are many ways for iris pixel detection step 200 to detect pixels that are associated with an iris. Such pixels can be identified by simple color thresholding methods, model mapping and other methods well known in the art.

In one preferred embodiment, iris pixels are detected using the method claimed and described in co-pending and commonly assigned U.S. Patent application Ser. No.09/740, 422 filed on 19 Dec. 2000 and entitled "Digital Image Processing Method and Computer Program Product for Detecting Human Irises in an Image". In this embodiment Iris Color Pixel Detection step 206 determines whether a pixel is an iris by measuring the red intensity of the pixel. This is done because it has been observed that a human iris has a low red intensity as compared to human skin which has a relatively high red intensity. However, in this embodiment, iris color pixels are not separated from skin color pixels on the basis of a simple threshold method. Instead, the red intensities of the pixels in the oval shaped skin colored region are used to determine the probability that each pixel is an iris and to determine the probability that each pixel is not an iris. The relationship between the probability that the pixel is an iris and the probability that the pixel is not an iris is then analyzed to determine whether the pixel is an iris pixel.

Figure 4:
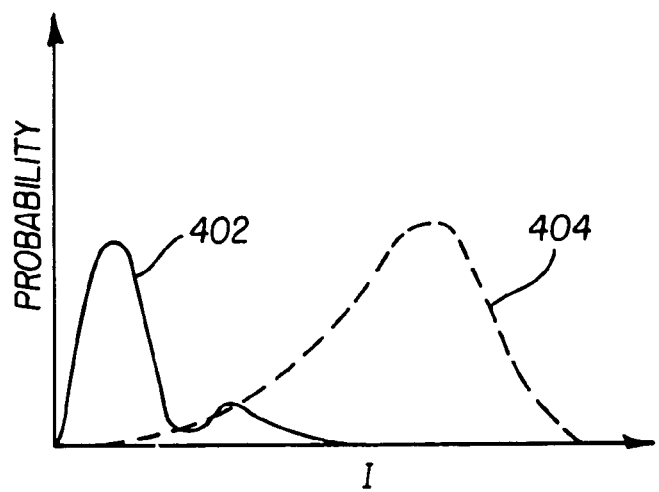
FIG. 4 is an illustration showing, the conditional probability that a given pixel is an iris pixel stated as a function of a specific red intensity and the conditional probability that a given pixel is a non-iris pixel as a function of a specific red intensity.

The probability that a pixel having a given red intensity is an iris pixel is determined based upon an iris statistical model. Similarly, a non-iris statistical model is used to define the probability that a given pixel is not an iris pixel based upon the red intensity level of the pixel. The relationship between these models is non-linear as is shown by way of example in FIG. 4, which is an illustration showing an example of a statistical model representing the conditional probability 402 that a given pixel is an iris pixel as a function of a specific red intensity I and an example of a statistical model representing the conditional probability 404 that a given pixel is a non-iris pixel as a function of a specific red intensity I.

The probability analysis can take many forms. For example, the probabilities can be combined in various ways with a pixel being classified as an iris or not on the basis of the relationship between these probabilities. However, in a preferred embodiment, a mathematical construct known as a Bayes model is used to combine the probabilities to produce the conditional probability that a pixel having a given red intensity belongs to an iris.

In this embodiment, the Bayes model is applied as follows:

$$P(\text{iris} | I) = \frac{P(I | iris)P(iris)}{P(I | iris)P(iris) + P(I | noniris)P(noniris)},$$

where P(iris|I) is the conditional probability that a given pixel intensity belongs to an iris; P(I|iris) is the conditional probability that a given iris pixel has a specific intensity I; P(iris) is the probability of the occurrence of an iris in the face oval region; P(I|noniris) is the conditional probability that a given non-iris pixel has a specific intensity I; and P(noniris) is the probability of the occurrence of a non-iris pixel in the face oval region. The Bayes model further applies the probability of the occurrence of an iris in a face oval region and the probability of the occurrence of a non-iris pixel in the face oval region. Using a probability analysis based on the Bayes model, a pixel is classified as an iris if the conditional probability that a pixel having a given red intensity belongs to an iris is greater than, for example, 0.05.

In the embodiment described above, only those pixels in the oval shaped skin color region defined by Oval_top 300, Oval_bottom 302, Oval_left 304, and Oval_right 306 are examined. Confining the pixels to be examined to those in the Oval shaped skin color region reduces number of pixels to be examined and decreases the likelihood that pixels that are not irises will be classified as such. It will be understood that confining the pixels to be examined to those in the skin color region, as is described in other embodiments of the present invention, conveys similar advantages. It will also be understood that it is not necessary to detect skin color regions and that the present invention can be practiced by measuring the red intensity of each pixel in the image and determining whether a pixel is an iris based upon the probability analysis described above.

Figure 5:
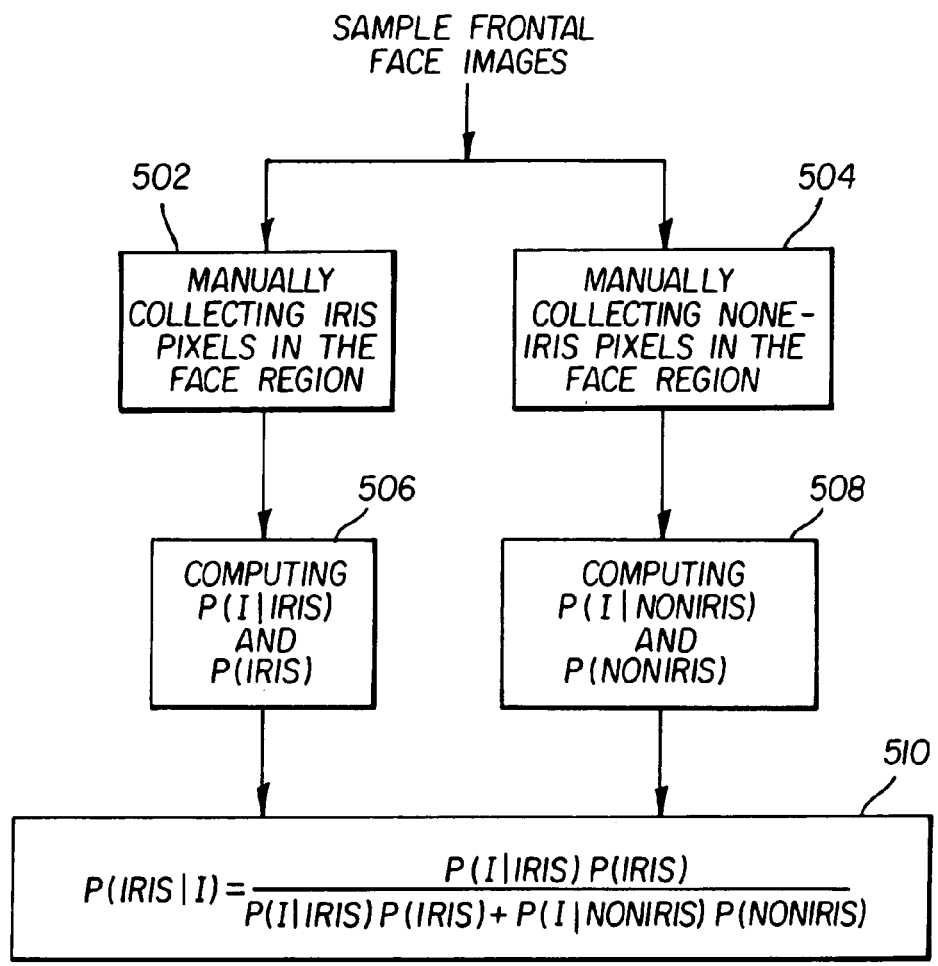
FIG. 5 is a flowchart presenting the process of developing a statistical model representing the conditional probability that a given pixel is an iris pixel as a function of a specific red intensity level and a statistical model representing the conditional probability that a given pixel is a non-iris pixel as a function of a specific red intensity level.

FIG. 5 shows a flow chart illustrating the Iris Color Bayes Model Training step 226 used to define the statistical model used to determine whether the pixel is an iris pixel and the statistical model used to determine whether the pixel is a non-iris pixel. The method of step 226 is performed before the method for detecting irises of the present invention is used to detect irises. As is shown, in FIG. 5, a large sample of frontal face images is collected and examined. All iris pixels and non-iris pixels in the face region are then manually identified 502 and 504. Next, the conditional probability that a given iris pixel has a specific red intensity I, P(I|iris) is computed and the probability of the occurrence of an iris in the face oval region, P(iris) 506 is computed; then the conditional probability that a given non-iris pixel has a specific red intensity I, P(I|noniris) is computed and finally the probability of the occurrence of a non-iris pixel in the face oval region, P(noniris) 508 is computed. The computed statistical models of iris and non-iris are used in the Bayes model to produce the conditional probability that a given pixel intensity belongs to an iris P(iris|I) 510. In certain embodiments the Bayes model can be used to generate a look-up table to be used in Iris Color Pixel Detection step 206.

After the Iris Color Pixel Detection step 206 identifies the location of the iris pixels in the image, the iris color pixels are then assigned to clusters. This is done by Iris Pixel Clustering step 208. A cluster is a non-empty set of iris color pixels with the property that any pixel within the cluster is also within a predefined distance to another pixel in the cluster. One example of a predefined distance is one thirtieth of the digital image height. The Iris Pixel Clustering step 208 of FIG. 2 groups iris color pixels into clusters based upon this definition of a cluster. However, it will be understood that pixels may be clustered on the basis of other criteria.

Under certain circumstances, the definition of a cluster of iris color pixels may be broad enough to include clusters that are invalid. In such a circumstance, as is shown in FIG. 2, the step of validating the clusters is included as step 209. A cluster may be invalid because, for example, it contains too many iris color pixels or because the geometric relationship of the pixels in the cluster suggests that the cluster is not indicative of an iris. For example, if the ratio of a cluster's height to its width is determined, and if the ratio is greater than two, then this cluster is invalid. Invalid iris pixel clusters are removed from further consideration. Accordingly, in the portions of the description that follow, valid iris pixel clusters will be referred to simply as iris pixel clusters.

The number of iris pixel clusters "n" is counted in step 210. The number of iris pixel clusters "n" is used by decision step 210 to select from among two paths for detecting eyes in an image. If the number of iris pixels "n" is less than two then the process is branched to step 224 which is to be described later. If the number of iris color pixels "n" is at least two, then the process branches to step 212 to find the centers of the clusters. The center of a cluster is determined as the center of mass of the cluster. The center position of the clusters is calculated with respect to the origin of the image coordinate system. For the purposes of this measurement, the origin of the image coordinate system is at the upper left corner of the image boundary.

Figure 6:
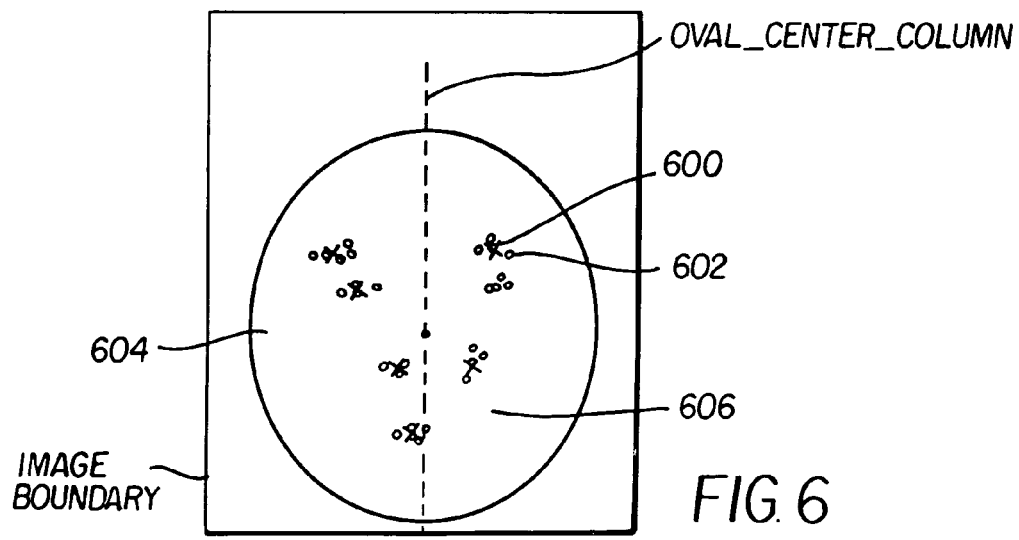
FIG. 6 is an illustration showing the iris color pixel clusters.

After the center of each of the iris pixel clusters is located, geometric reasoning is applied to attempt to detect eyes based on the geometric relationship between the iris pixel clusters. As is shown in FIG. 6, if there are only two clusters remaining, with one in the left-half 604 and one in the right-half 606 and if the horizontal distance between the centers of the two clusters is less than 0.4 times the distance between Oval_right 306 and Oval_left 304 and if the vertical distance between the centers of the two clusters is less than one tenth of the distance between Oval_top 300 and Oval_bottom 302, then the center positions of these two clusters are treated as the eye positions.

It will be appreciated that this analysis can be completed very rapidly. If this analysis is successful, then no further action is required to detect eye positions. Accordingly, a detection result check is done in step 216 to see if eye positions are detected. If eye positions are detected, then the eye detection process stops. If no eye positions are detected, then the process goes to step 218.

In step 218 the summation of squared difference method is used to search the image for eye positions. In general, the summation of the squared difference method involves calculating the summation of the squared difference of the intensity values of the corresponding pixels in an eye template and a patch of the image that has the same size as the template. In this method, each pixel in the patch of pixels has a corresponding pixel in the template. The difference between the intensity level of each of the corresponding pixels is calculated. Each difference is then squared. The sum of each of the squared differences for each of the pixels in the set is then calculated. This summation of the squared differences provides a relative measure of the degree of correspondence between each of the pixel sets measured and the template. If no eye positions are detected 220, then the process goes to 224.

As applied in the present invention, summation of the squared difference values are calculated for each pixel in each window in each half-region. These values are compared and the cluster having the lowest relative summation of the squared difference value is selected identified as an eye location for the respective half region. This process is performed separately on the clusters of the left and the right-half regions of the image in the manner described below.

It will be noted that while the present invention has been described as using the summation of the squared difference method to identify the best relative correlation between the average eye template and each of the patches of pixels, other methods including the mean-squared-error method can be used for this purpose.

In one embodiment of the method of the present invention, the parameters calculated in the Oval Region Detection Step 204 are used to increase the efficiency of the use of the summation of the squared difference method by reducing the number of locations in the image at which the summation of the squared difference must be calculated. As is shown in FIG. 6, in this embodiment, the Oval_Center_Column 310 is used to divide the oval region into a left-half region 604 and a right-half region 606. As is also shown in FIG. 6, iris pixel clusters 600 and the center position 602 of the iris pixel clusters 600 are positioned in either the left-half or right-half regions 604 and 606 separated by the Oval_Center_Column 310.

Step 218 conducts a left-eye position search using the summation of squared difference method and the pixel clusters 600 located on the left-half region 604. Step 218 also conducts a right-eye position search in the right-half region using the summation of squared difference method and the iris pixel clusters 600 located in the right-half region 606.

Figure 7:
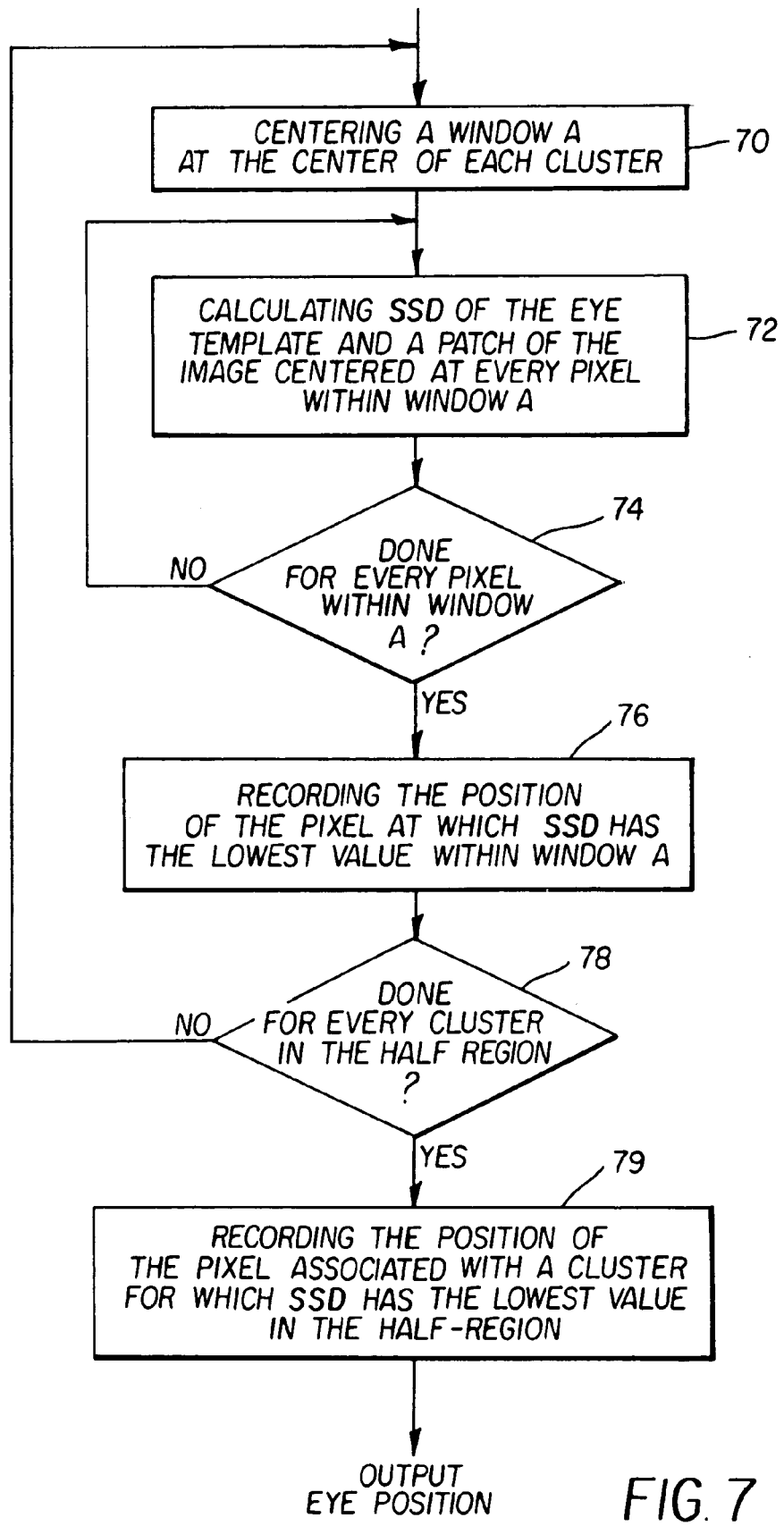
FIG. 7 is a flowchart illustrating the process of applying the method of summation of the squared difference to eye position detection using iris pixel clusters.
Figure 8:
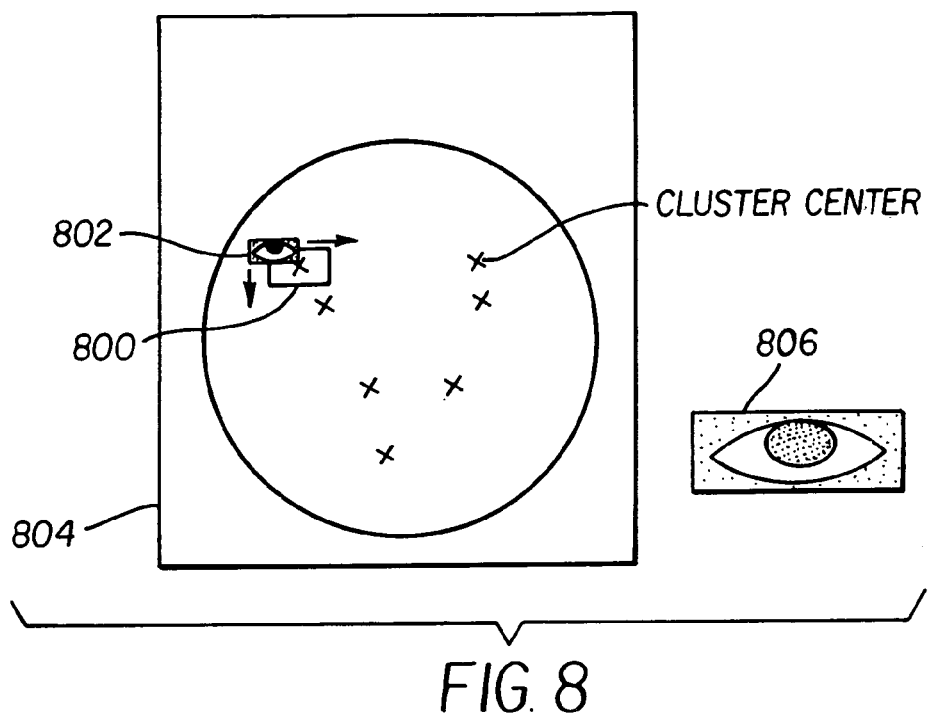
FIG. 8 shows an eye template and a search window centered at the center of an iris pixel cluster.

Referring now to FIGS. 7 and 8, the process for selecting one cluster from the clusters in a half region will be described. The eye position search process is started by centering 70 a window 800 at the center of each cluster 802 in a respective half-region. The default size for window 800 is one twentieth of the size of the image 804. The operation of calculating the summation of the squared differences 72 is then performed on each of the pixels in each window 800. The position of the pixel having the lowest summation of squared difference value in each window 800 is recorded 76. When a summation of the squared difference value has been calculated for every pixel in every window of the half-region 78, the position of the pixel having the lowest summation of squared difference value is recorded 79. This is the estimated eye position for a half-region. This process is repeated for the remaining half-region. If two eyes are detected by this process, then the method is ended.

It will be appreciated that the summation of the squared difference method of step 218 can also be performed without the use of Oval Shaped Skin Color Extraction. In such an embodiment, the skin color region can be divided into a left-half region and a right-half region. Iris pixel clusters can then be divided into left-half region and right-half region clusters. The summation of the squared difference method can then be applied as described above.

Figure 9:
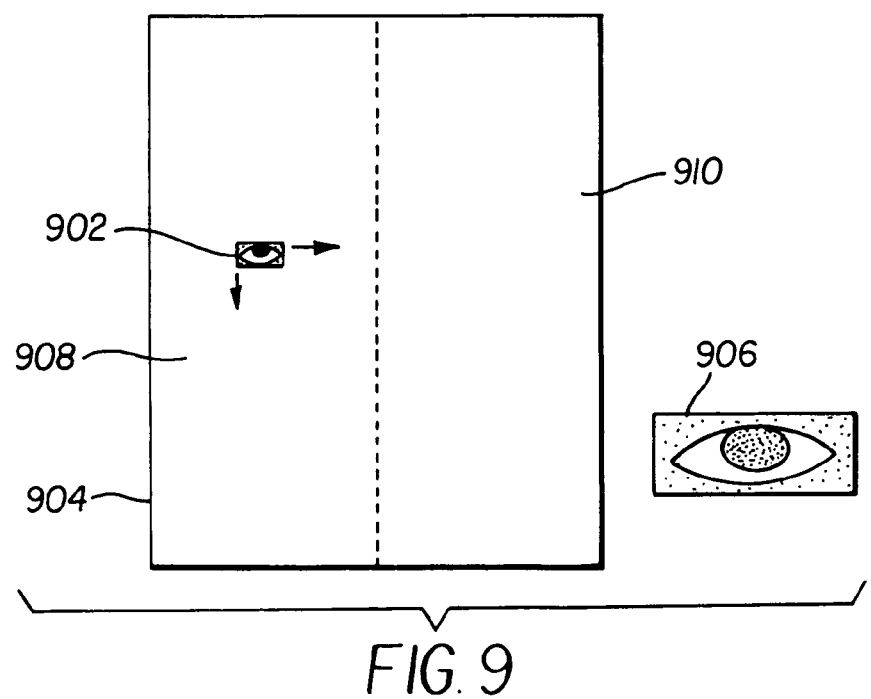
FIG. 9 shows an eye template and an image as used in the process of applying the method of summation of the squared difference to eye position detection using image pixels.

However, if eyes have not been detected 220 after the execution of step 218, or if less than two iris pixel clusters are detected at step 209 then the eye detection process goes to step 224. Step 224 operates in a manner that is similar to step 218. However, as is shown in FIG. 9, the entire image 900 is divided and a summation of the squared difference is calculated for every pixel of the image 904 in the left-half 908 and right-half 910 region respectively.

It will be understood that other methods can be used in place of the summation of squared difference method to determine the relative correlation between a patch of an image and an eye template. One example is the mean squared error method. This method is well known in the art.

It will be appreciated that the present invention provides three distinct steps methods to detect eyes in an image; geometric reasoning 212 and 214, summation of the squared difference using iris pixel clusters 218 and summation of the squared difference using image pixels 224. It will also be understood that geometric reasoning is the simplest and most efficient of these methods. This is because geometric reasoning provides the most efficient processing method and because geometric reasoning is applied only to iris pixel clusters. These clusters are relatively small in number when compared to the number of pixels in the image.

In contrast, applying a summation of the squared difference method to each of the pixels in an image as is required in step 224 is a computationally heavy step, requiring many processing steps and calculations to determine whether a single pixel in the image is an eye position. Further, the method of step 224 must be applied to all of the non-iris pixels in an image. In a currently common format, digital images are being acquired by 2.1 megapixel cameras. Further, cameras having as many as 16 megapixels have been demonstrated. Thus, it is clear that using step 224 to detect eye positions in an image will require, literally, hundreds of millions of operations to process a single image. This is a time and computer intensive process.

As an intermediate approach, step 218 applies a computationally heavy summation of the squared difference method, but limits the application of this method to the pixels in the windows defined about the iris pixel clusters. This substantially reduces the number of pixels to which the summation of the squared difference method must be applied and therefore makes the application of the summation of the squared difference method 220 less computer intensive than the summation of the squared difference method of step 224.

Figure 10:
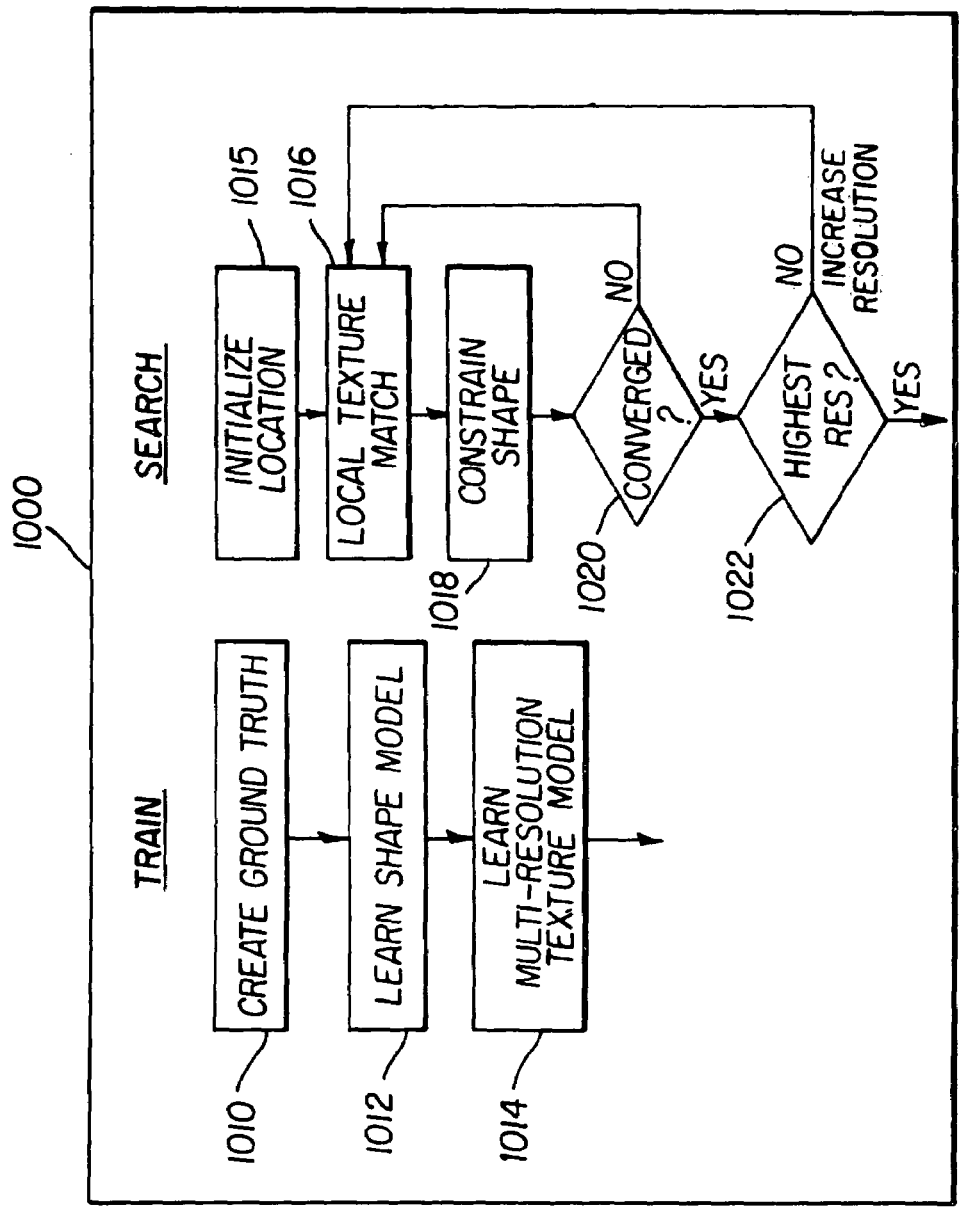
FIG. 10 is a flowchart illustrating the process of training facial feature models and searching facial features.

Step 1000 locating facial features in FIG. 2 is now detailed in FIG. 10. A "Posed" image database was initially selected as the ground truth images 1010. This database comprises portrait style pictures that depict a frontal view of the subjects. The faces in the database are similarly sized with an exemplary average inter-ocular distance of 83 pixels.

The active shape model technique represents object shapes with one or more groups of connected feature points. These feature points determine the locations where local searches are performed. The connections between points determine the boundary normals that are used to define the search directions and the texture window orientations. The feature points indicate a series of application specific "landmark" positions, and are typically placed along the border of an object. The connections between points normally designate the edges of the object. There are a number of engineering decisions that must be made when modeling the shape of the object. The most important of these decisions is determining where to place the feature points. These points should be positioned on consistent and unique textures that are easily identifiable from the surrounding area. Edges and corners of an object are usually good landmark points. If multiple points are placed along a given edge they should be distributed at fixed intervals to avoid introducing unnecessary variability into the shape model.

It is sometimes useful to supplement the points that are required by a given application with a number of additional points. These additional points can be used to increase the accuracy of the original features by providing additional support. This is possible if the additional points are placed on easily identifiable locations that have a strong positional correlation with the original points.

The quantity of the feature points is another important decision. Increasing the number of points can improve the accuracy of the results and provide a better description of the object shape.

The relative density of the feature points is also significant. Each point has an equivalent influence on the resulting shape of the object. Therefore, areas with a high density of feature points tend to have a greater accuracy than regions with a sparse distribution of points.

Finally, the orientation of the normals at the feature points must be considered. The normals determine the predominant search directions and influence the likelihood that the correct points will be found. The normals also control the alignment of the primary axis of the texture windows. This affects the ability of the model to capture the salient textural attributes.

Figure 11A:
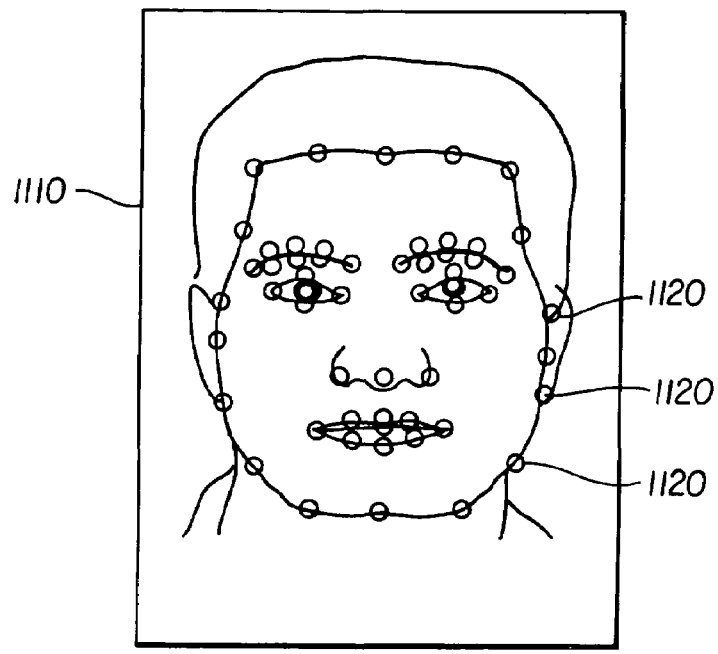
FIG. 11a shows examples of manually marked feature points.

An exemplary shape model consisting of 82 points was selected to denote the positions of the facial features. This model indicates the outline of the eyebrows, eyes, nose, mouth, and facial region. Points are also placed at the center of the pupils and the tip of the nose. The locations of the feature points must be indicated for each of the example images. This process is generally performed manually. FIG. 11a illustrates the facial feature model and depicts the annotated feature positions 1120 in an example image 1110. The correct placement of the feature points is often ambiguous. This can occur when objects such as hair or glasses occlude the desired features. A decision must be made to either select consistent locations or consistent textural features (edges). The appropriate choice depends upon the application.

Figure 11B:
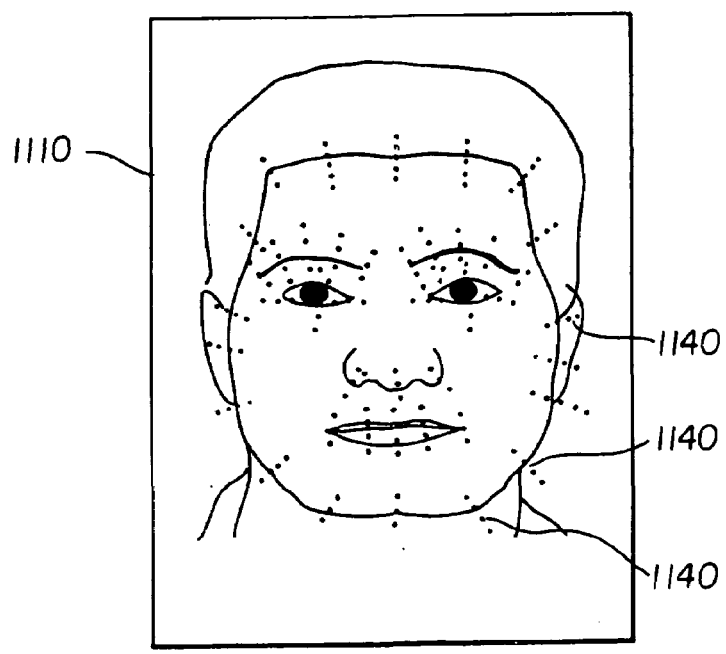
FIG. 11b shows examples of texture windows at the feature points.

A texture model is created by first defining a rectangular texture window 1140 to be centered over the associated feature point as illustrated in FIG. 11b. This window specifies the region of the image to be described by the model. The user can specify the extent and resolution of the window. An example resolution of 1 by 15 pixels was use in this invention. The major axis of the window is aligned with the normal to the shape boundary. The texture window is automatically scaled based on the size of the shape. The scale factor is determined from the optimal Euclidean transformation that aligns the example with the mean shape. This ensures that the windows for each image cover a consistent portion of the object.

A training algorithm is used to analyze the ground truth data. This algorithm learns models that are employed during subsequent searches. The training process does not require user interaction. Models of both shape and texture are created. The shape model describes the expected relative positions of the feature points. The texture models represent the anticipated appearances of each feature point. These models only need to be generated once and are stored for later use.

The shape model describes the "space" of allowable feature positions. This model is used to constrain unlikely search results to the domain of plausible shapes. The shape model consists of the mean shape, the primary modes of shape variation, and the associated ranges for each of the modes.

The initial step in learning the shape model 1012 is to align the feature positions from the ground truth into a common coordinate system. This eliminates variation from the model that is the result of global transformation. The steps are as follows:

1. Select one example as an initial estimate of the mean shape.
2. Normalize the scale and orientation of the mean
3. Align all shapes with the current estimate of the mean. The optimal Euclidean transformation (translation, scale, and rotation) is determined by a least squares fit.
4. Re-estimate the mean from the aligned shapes.
5. Repeat steps 2–4 until the estimate of the mean converges.

Shapes can be thought of as points in a 2P-dimensional space, where P is the number of 2-dimensional feature points. The aligned ground truth forms a cloud of points in this space with limits that can be modeled by a hyper-elliptical boundary. A compact representation of this boundary can be derived from a principal components analysis (PCA).

PCA provides a method to reduce the dimensionality of the shape space while retaining its salient features. This is accomplished by computing a set of orthogonal axes that are aligned with the directions of the most significant variation in the point cloud of example shapes. These axes indicate the most common modes of variation in the shape. The axes form an optimal basis that can be used to represent valid shapes with a minimum number of parameters.

The aligned feature coordinates of each example shape can be arranged into a vector $x_i$ of length 2N. The covariance matrix S is produced from the expression:

$$S = \frac{1}{N}\sum_{i=1}^{N}(x_i - \bar{x})(x_i - \bar{x})^T, \tag{1}$$

where N is the number of ground truth examples. An ordered list of the principal axes is given by the unit eigenvectors $v_k$ (k=1, . . . , 2N) such that $$Sv_k = \lambda_k v_k, \tag{2}$$

where $\lambda_k$ is the $k^{th}$ eigenvalue and $\lambda_k \geq \lambda_{k+1}$. The eigenvectors that correspond to the largest eigenvalues indicate the most common modes of variation in the shape.

Figure 12:
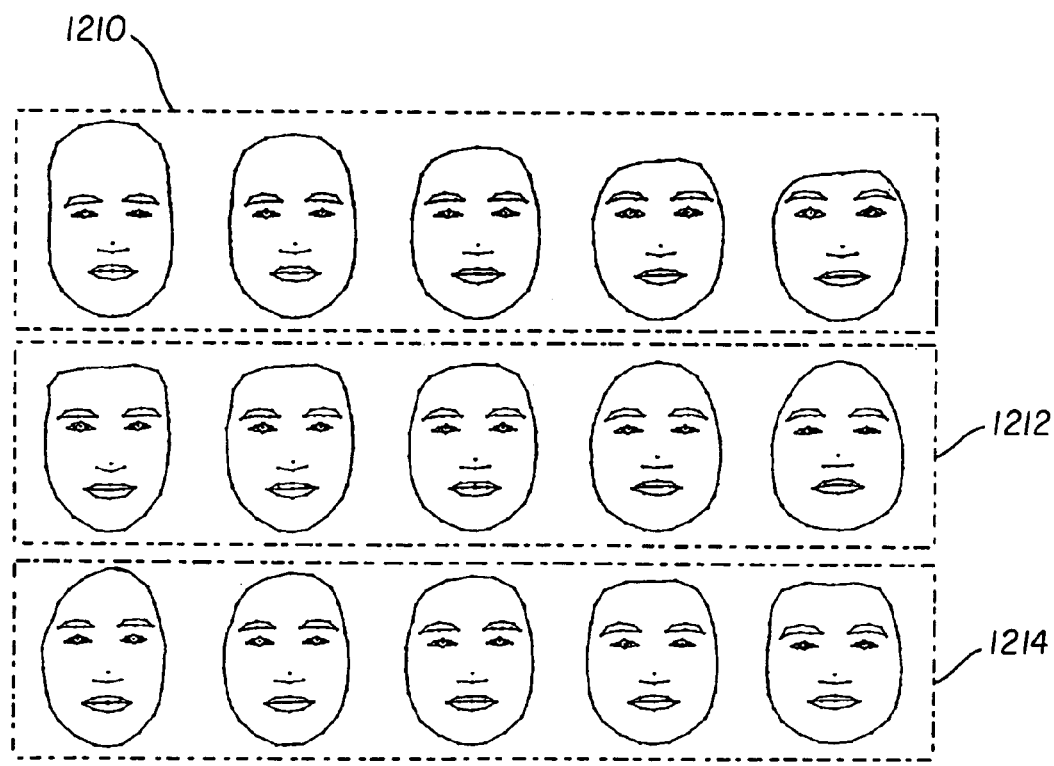
FIG. 12 shows sample facial models.

FIG. 12 illustrates three most significant axes of the facial shape model. Portrayed shapes are the results of varying the mean shape along the given eigenvector. It is interesting to note that a number of the primary axes are strongly related to semantically meaningful variations in the face shape. For instance, the first axis 1210 is related to the position of the hairline, the second axis 1212 is associated with the forward tilt of the head, and the third axis 1214 is correlated with the facial width.

The majority of the shape space can often be represented with relatively few of the primary axes. The number of axes to retain can be determined from the eigenvalues. The eigenvalues are equal to the variance of the ground truth along the axis specified by the corresponding eigenvector. The appropriate number of axes can be determined by selecting the quantity that encapsulate a given fraction f the total variance (e.g. 0.98). This is accomplished by selecting the first M eigenvectors such that $$f \approx \frac{\sum_{k=1}^{M} \lambda_k}{\sum_{k=1}^{2N} \lambda_K}. \qquad (3)$$

An arbitrary shape can be approximated from the mean shape and a linear combination of perturbations along these axes using $$x = \bar{x} + Vb, \qquad (4)$$

where $V = (V_1 V_2 \ldots V_M)$ is the matrix of the first M eigenvectors, and $b = (b_1 b_2 \ldots b_M)$ is a vector of weights. The vector of weights forms the parameters of the shape model and can be computed from a given set of feature positions from the inverse expression $$b = V^T (x - \bar{x}). \qquad (5)$$

Any shape can be made to resemble the examples in the ground truth by determining the vector of weights and placing limits on the range of these values. Suitable limits can be derived from the eigenvalues that specify the variance of the ground truth along each axis. One possibility is to limit the weights to a range of 3 standard deviations along each axis. This can be accomplished by clipping the weights so that $$-3\sqrt{\lambda_k} \leq b_k \leq 3\sqrt{\lambda_k}. \qquad (6)$$

In step 1014, the region of the image covered by the texture window is extracted for every resolution at each feature point and encoded for each example in the ground truth and then texture models are calculated using the encoded textures.

There are a variety of ways to encode the texture. The best results are currently being achieved using the following method. The texture is originally represented as a color RGB image in sRGB color space. The intensity gradient profile is calculated for each color channel. This is accomplished by computing the difference of neighboring pixel values along the normal direction. The gradient profiles are then normalized by the mean intensity and combined into a single vector t. This representation retains information about the orientation and relative positions of color edges within the texture window and normalizes out the absolute intensity and edge strength. This has the benefit of adequately describing the appearance of the texture while minimizing the effect of brightness and contrast changes within the image.

The encoded textures from each example are used to calculate the final texture model. This model consists of the mean encoded texture t and the covariance matrix $S_t$. This matrix is calculated as in Equation 1, albeit with slightly different variable names. The covariance matrix serves to describe the range of variation of each pixel in the texture as well as how the individual pixels co vary. This provides a complete statistical representation of the distribution of example textures if we assume a unimodal Gaussian distribution.

The texture model provides the basis for determining the goodness of fit of texture candidates. The quality of the match can be determined by the Mahalanobis distance metric. This metric is given by $$f(t) = (t - \bar{t})^T S_t (t - \bar{t}), \qquad (7)$$

where f(t) specifies the weighted distance of the candidate from the mean. This value is linearly related to the log of the probability that the candidate comes from the example distribution.

During training, a separate texture model needs to be created for every resolution at each feature point. The models for various levels are all centered over the feature point and encoded using the same number of pixels. A coarse texture typically covers twice the extent of each successively finer texture.

Figure 13:
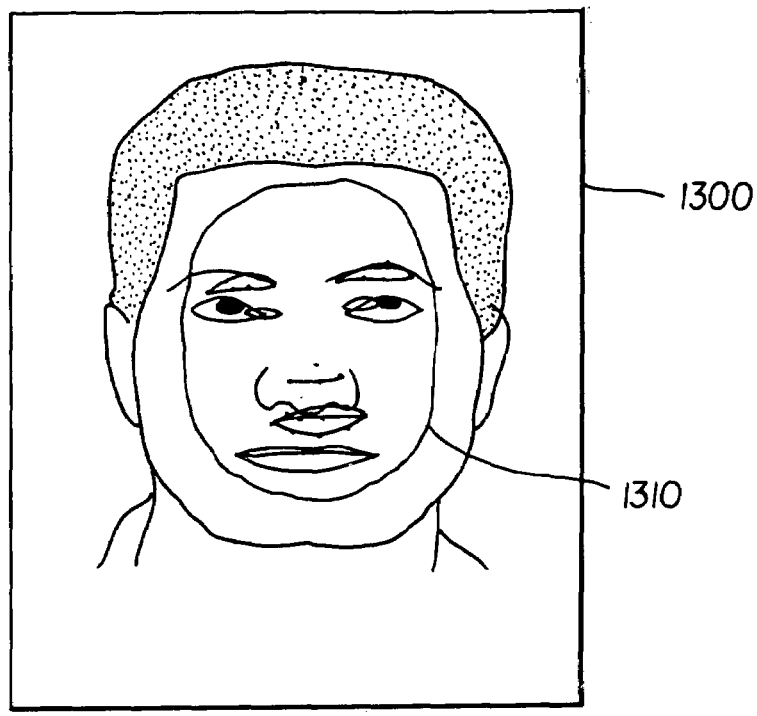
FIG. 13 shows an initial position of a mean shape in an image.

FIG. 13 displays an exemplary image 1300 for facial feature finding. A mean shape 1310 obtained from step 1012 is initialized in step 1015 at the eye positions obtained from one of the three steps: step 216, step 220, or step 224. With the help of the mean shape 1310, the positions of the feature points 1120 within an image are determined by performing a series of local searches in step 1016. The current estimates of the feature locations of the mean shape model 1310 at the initial position determined by the estimated eye locations are used to initialize the search positions. A number of texture windows 1140 are extracted from the area surrounding each point on the shape model 1310. The contents of these windows are compared with the texture model developed in step 1014 to determine the position that best matches the expected appearance of the feature.

The search direction is oriented along the normal to the shape boundary. The user can specify the spacing and quantity of the search positions. In this invention an exemplary range of 3 by 7 set of locations is investigated. The search intervals are dynamically scaled to insure that a consistent region of the face is covered.

At each search position a texture window 1140 is extracted and encoded as discussed in step 1014. The similarity of the texture window to the texture model is measured by the Mahalanobis distance described in Equation 7. The position with the minimum distance is selected as the new feature location. This process is repeated for each feature point.

The feature positions 1120 identified by the local texture matching step are prone to error. This error is due in part to the variable appearance of the features and to their similarity with surrounding regions. The accuracy is also limited by the small size of the texture windows 1140 that are necessary to localize the precise positions of the features. The quality of the search results can be significantly improved by limiting the feature points to the range of plausible shapes that is described by the shape model.

The feature points 1120 can be constrained to valid shapes by using the following process. First, the current shape is aligned with the mean shape that was calculated during the training process 1012. The Euclidean transform that aligns the two shapes is determined from a least squares fit. The aligned feature coordinates are projected into the PCA shape space using Equation 5. The shape coefficients are then limited to a reasonable range. A range that includes an exemplary 99.975% of valid shapes was used in this invention. The feature locations 1120 that correspond to the limited shape coefficients are computed using Equation 4. Finally, the Euclidean transformation is inverted to convert the aligned shape back into image coordinates.

Figure 14:
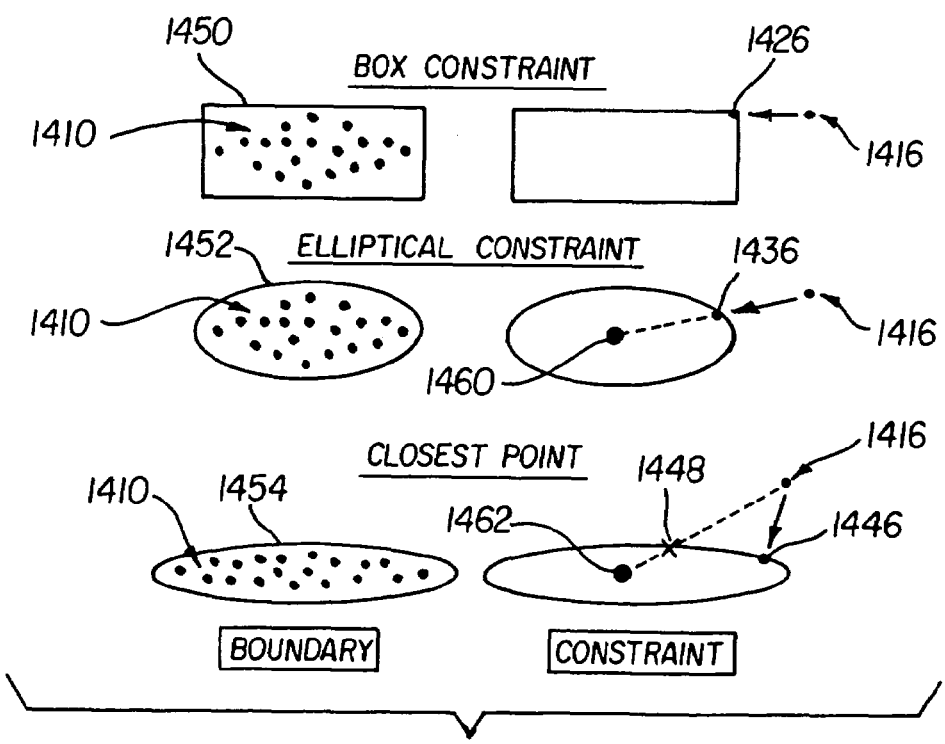
FIG. 14 illustrates using different schemes to constrain shape model coefficients.

There are a number of ways to constrain the shape coefficients. Three approaches are illustrated in FIG. 14. The simplest method is to merely clip each coefficient so that it does not exceed a given number of standard deviations of the ground truth 1410 along each axis. These limits are described in Equation 6. This corresponds to using a multi-dimensional box 1450 for the limits as illustrated in FIG. 14. An estimated shape 1416 outside the ground truth space 1410 could be constrained to a shape 1426 at the box corner. The problem with this approach is that the shapes 1426 that reside at the corner of the box have a significantly lower likelihood of occurrence than the specified threshold.

A better approach is to use a hyper-elliptical boundary 1452 to limit the range of the coefficients. This can be accomplished by uniformly scaling all coefficients so that $$\sum_{k=1}^{M} \frac{b_k^2}{\lambda_k} \leq l, \qquad (8)$$

where the limit l is chosen using the $x^2$ distribution. This approach is illustrated in the middle diagram of FIG. 14. For an estimated shape 1416 outside the ground truth space 1410, the constrained shape will be the intersection point 1436 of the ellipse boundary 1452 and the line between the estimated shape point 1416 and the ellipse center 1460. The point 1460 is not necessary the closest point on the ellipse boundary to the point 1416.

In this invention, a better shape can be found by choosing the point 1446 on the boundary of the hyper-ellipse that is nearest the position of starting shape 1416. This approach is depicted in the bottom diagram of FIG. 14. The point 1448 that would be erroneously selected by the elliptical constraint method is given by the intersection of the dotted line with the elliptical boundary.

Finding the closest point on a hyper-elliptical boundary requires the solution of a high degree polynomial. This polynomial cannot be solved analytically. However, it can be solved numerically using an extension of an algorithm created by Hart (see Hart, J. C., "Distance to an Ellipsoid, "*Graphics Gems IV*, Paul S. Heckbert Editor, Academic Press, Boston, Mass., pp. 113–119, 1994.) Hart developed an approach that uses an intelligent parameterization of the problem to yield an expression wherein the correct root of the polynomial lies within a known set of bounds. This root can be easily found using bracketing and bisection. Hart describes the algorithm for the case of a 3-dimensional ellipse. This approach is relatively straightforward to extend to an arbitrary number of dimensions.

In step 1020, the process of finding local texture matches and then constraining the global shape is repeated until the shape converges upon a stable result. It is possible to measure the amount that the shape changes on each iteration and discontinue the process when the change drops below a given threshold. However, the shape converges so rapidly that this is not necessary. Instead, good results have been achieved by merely repeating the process for a fixed number of iterations.

In the current invention, the active shape model algorithm can be implemented in a multi-resolution framework with step 1022. This efficiently extends the range over which features can be accurately identified. The multi-resolution version of the algorithm initially searches the image using large, coarse texture models and wide search areas. The approximate feature positions are then refined using successively smaller and finer texture models and narrower search areas.

The positions that are examined when searching are scaled similarly to the texture windows. These locations are centered over the current estimate of the feature position and the same number of points is investigated at each resolution. The spacing between the search locations that are used with a coarse texture model is generally double that used with each consecutively finer texture model.

The searching algorithm initially uses the coarsest texture models and the most widely spaced search locations. The process of local texture matching and constraining the global shape is repeated until the shape is converged. This process is repeated for each resolution using finer texture models and more narrowly spaced search intervals. Four resolutions were used in this work to provide both a large search interval and fine localization of the feature positions.

It will also be understood that the method of the present invention provides a way for automatically selecting between these eye detection methods and combining these methods in a manner that uses the number of iris pixel clusters to select the most efficient method for detecting eyes in the image.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described in detail with particular reference to certain preferred embodiments thereof, but it will be understood that variations and modifications can be effected within the spirit and scope of the invention.

| PARTS LIST |
| --- |
| 10 digital image source |
| 12 image processor |
| 14 display |
| 16 keyboard |
| 17 computer readable storage medium |
| 18 mouse |
| 19 output device |
| 70 centering window step |
| 72 summation of squared difference calculator |
| 74 checking step |
| 76 position recording step |
| 78 checking step |
| 79 position recording step |
| 200 pixel detection |
| 201 color histogram equalization step |
| 202 skin detection step |
| 204 oval region extraction step |
| 206 iris color pixel detection step |
| 208 iris pixel clustering step |
| 209 pixel validation step |
| 210 number of pixels detected decision step |
| 212 finding centers of iris color pixel clusters |
| 214 detecting eye positions based on geometric reasoning |
| 216 eyes detected decision step |
| 218 detecting eye positions based on summation of squared difference using iris pixel clusters |
| 220 eyes detected decision step |
| 224 detecting eye positions using a summation of squared difference method using image pixels |

-continued

PARTS LIST 226 iris color Bayesian model training
300 Oval_top
302 Oval_bottom
304 Oval_left
306 Oval_right
308 Oval_center_row
310 Oval_center_column
402 statistical model of probability that a pixel is an iris
404 statistical model of probability that a pixel is not an iris
502 manually identifying iris pixels for statistical model
504 manually identifying non-iris pixels for statistical model
506 computing probability step
508 computing probability step
510 applying Bayes model
600 cluster center
602 iris color pixel
604 left half region
606 right half region
800 a window
802 average eye template moving in window
804 image
806 average eye template
902 an average eye template moving in the image
904 image
906 average eye template
908 a left-half of image
910 a right-half
1000 locating facial feature step
1010 collecting ground truth step
1012 learning shape model step
1014 learning multi-resolution texture model step
1015 initialization step
1016 local texture matching step
1018 constraining shape step
1020 converge checking step
1022 resolution checking step
1110 an image
1120 feature points
1140 texture windows
1210 sample shapes
1212 sample shapes
1214 sample shapes
1300 an image
1310 a mean shape
1410 ground truth
1416 a sample shape
1426 a shape point
1436 a shape point
1446 a shape point
1448 a shape point
1450 a boundary
1452 a boundary
1454 a boundary
1460 a mean shape point
1462 a mean shape point

What is claimed is:

1. A digital image processing method for detecting facial features in a digital image, comprising the steps of:
   detecting iris pixels;
   clustering the iris pixels;
   selecting at least one of the following methods to identify eye positions in an image:
      i) applying geometric reasoning to detect eye positions using the iris pixel clusters;
      ii) applying a summation of squared difference method to detect eye positions based upon the iris pixel clusters; and,
      iii) applying a summation of squared difference method to detect eye positions from the pixels in the image;
   wherein the method applied is selected on the basis of the number of iris pixel clusters; and locating facial features using identified eye positions; and
   wherein estimated locations to search for the facial features are based on the identified eye positions.

2. The method of claim 1, wherein the estimated locations to search for the facial features are found by aligning the eye positions within a model of the shape of the facial features with the identified eye positions.

3. The method of claim 1, wherein estimated locations to search for the facial features are based on the average position of these features within a set of example faces.

4. A digital image processing method for detecting facial features in a digital image, comprising the steps of:
   detecting iris pixels;
   clustering the iris pixels;
   selecting at least one of the following methods to identify eye positions in an image:
      i) applying geometric reasoning to detect eye positions using the iris pixel clusters;
      ii) applying a summation of squared difference method to detect eye positions based upon the iris pixel clusters; and,
      iii) applying a summation of squared difference method to detect eye positions from the pixels in the image;
   wherein the method applied is selected on the basis of the number of iris pixel clusters; and locating facial features using identified eye positions; and
   wherein the facial feature positions are identified using an active shape model technique.

5. The method of claim 4, wherein the shape model technique uses texture windows and the size of the texture windows is automatically scaled based on a current estimate of the size of the face.

6. The method of claim 5 wherein an estimate of the size of the face is found by determining a scale that best aligns a current estimate of the feature positions with a model of average positions of the facial features using a least squares process.

7. The method of claim 4, wherein spacing of search locations is automatically scaled based on a current estimate of the size of the face.

8. The method of claim 7 wherein an estimate of the size of the face is found by determining the scale that best aligns a current estimate of the feature positions with a model of the average positions of the facial features using a least squares process.

9. The method of claim 4, wherein the positions of the facial features that are outside a shape space boundary are constrained to locations of a shape found at a nearest point on a hyper-elliptical boundary of the shape space.

10. A computer program product for detecting facial features in a digital image, the computer program product comprising a computer readable storage medium having a computer program stored thereon for performing the steps of:
   detecting iris pixels;
   clustering the iris pixels;
   selecting at least one of the following methods to identify eye positions in the image:
      i) applying geometric reasoning to detect eye positions using the iris pixel clusters;
      ii) applying a summation of squared difference method to detect eye positions based upon the iris pixel clusters; and
      iii) applying a summation of squared difference method to detect eye positions from the pixels in the image;
   wherein the method applied is selected on the basis of the number of iris pixel clusters; and locating facial features using identified eye positions; and wherein estimated locations to search for the facial features are based on the identified eye positions.

11. The computer program product of claim 10, wherein the estimated locations to search for the facial features are found by aligning the eye positions within a model of the shape of the facial features with the identified eye positions.

12. The computer program product of claim 10, wherein estimated locations to search for the facial features are based on an average position of these features within a set of example faces.

13. A computer program product for detecting facial features in a digital image, the computer program product comprising a computer readable storage medium having a computer program stored thereon for performing the steps of:
- detecting iris pixels;
- clustering the iris pixels;
- selecting at least one of the following methods to identify eye positions in the image:
  - i) applying geometric reasoning to detect eye positions using the iris pixel clusters;
  - ii) applying a summation of squared difference method to detect eye positions based upon the iris pixel clusters; and
  - iii) applying a summation of squared difference method to detect eye positions from the pixels in the image;
- wherein the method applied is selected on the basis of the number of iris pixel clusters; and locating facial features using identified eye positions; and wherein the facial feature positions are identified using an active shape model technique.

14. The computer program product of claim 13, wherein the shape model technique uses texture windows and the size of the texture windows is automatically scaled based on a current estimate of the size of the face.

15. The computer program product of claim 13, wherein spacing of search locations is automatically scaled based on a current estimate of the size of the face.

16. The computer program product of claim 15 wherein an estimate of the size of the face is found by determining scale that best aligns a current estimate of the feature positions with a model of average positions of the facial features using a least squares process.

17. The computer program product of claim 14 wherein an estimate of the size of the face is found by determining a scale that best aligns a current estimate of the feature positions with a model of average positions of the facial features using a least squares process.

18. The computer program product of claim 13, wherein the positions of the facial features that are outside a shape space boundary are constrained to locations of a shape found at a nearest point on a hyperelliptical boundary of the shape space.

* * * * *